United States Patent
Ewert (10) Patent No.: US 10,263,900 B2
(45) Date of Patent: *Apr. 16, 2019

(54) PROGRAMMABLE PACKET PROCESSOR (PPP)-BASED ADAPTIVE NETWORK FUNCTION CHAINING

(71) Applicant: Level 3 Communications, LLC, Broomfield, CO (US)

(72) Inventor: Travis Duanne Ewert, Highlands Ranch, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,031

(22) Filed: Aug. 10, 2017

(65) Prior Publication Data

US 2018/0375777 A1    Dec. 27, 2018

Related U.S. Application Data

(60) Provisional application No. 62/524,261, filed on Jun. 23, 2017.

(51) Int. Cl.
| | |
|---|---|
| *H04L 12/853* | (2013.01) |
| *H04L 12/24* | (2006.01) |
| *H04L 12/851* | (2013.01) |
| *H04L 12/707* | (2013.01) |
| *H04L 12/725* | (2013.01) |

(52) U.S. Cl.
CPC ...... *H04L 47/2416* (2013.01); *H04L 41/0806* (2013.01); *H04L 41/5054* (2013.01); *H04L 45/24* (2013.01); *H04L 45/308* (2013.01); *H04L 47/2425* (2013.01); *H04L 47/2483* (2013.01)

(58) Field of Classification Search
CPC ............... H04L 47/2416; H04L 45/308; H04L 47/2425; H04L 41/5054; H04L 47/2483; H04L 41/0806; H04L 45/24
See application file for complete search history.

(56) References Cited

U.S. PATENT DOCUMENTS

| | | | |
|---|---|---|---|
| 2009/0238074 A1* | 9/2009 | Vasseur | H04L 45/02 370/237 |
| 2016/0028616 A1* | 1/2016 | Vasseur | H04L 45/22 370/412 |

OTHER PUBLICATIONS

"P4: Programming Protocol-Independent Packet Processors" by Bosshart et al, ACM SIGCOMM Computer Communication Review, pp. 88-95,, vol. 44, No. 3, Jul. 2014 (Year: 2014).*

* cited by examiner

*Primary Examiner* — Thai Nguyen (57) ABSTRACT

Disclosed herein are system, method, and computer program product embodiments for dynamically applying PPP-based network functions to traffic flows based on heuristics, policy conditions, and client-specified conditions. A network monitors a network traffic flow to determine whether the network traffic flow meets a first criterion of a first rule. The criterion specifies that when the first criterion is met, a PPP-based network function be used to analyze or process the network traffic flow. When the network traffic flow is determined to meet the first criterion, the network determines a first route through the network to a PPP-based router that provides the PPP-based network function and configures one or more routers along the first route to forward the network traffic flow to the PPP-based router for analysis or processing.

18 Claims, 7 Drawing Sheets

PROGRAMMABLE PACKET PROCESSOR (PPP)-BASED ADAPTIVE NETWORK FUNCTION CHAINING

CROSS-REFERENCE TO RELATED APPLICATIONS

This application claims the benefit of priority to U.S. Provisional Application No. 62/524,261 filed on Jun. 23, 2017 and entitled PROGRAMMABLE PACKET PROCESSOR (PPP) BASED ADAPTIVE NETWORK FUNCTION CHAINING, which is herein incorporated by reference in its entirety.

BACKGROUND

Technical Field

Embodiments generally relate to network services.

Background

Some modern data networks provide personalized services. Networks may provide connections between clients subject to service level agreements (SLAs) specifying characteristics and performance guarantees. For example, clients may establish a virtual Ethernet connection with a specified dedicated bandwidth.

To these connections, some networks may apply network functions, such as, for example, intrusion detection, firewalls, packet inspection, etc. Providing these functions may require changes to routing of traffic flow to route data to a server that provides the function. For example, an intrusion detection system may inspect sequences of packets to detect and prevent network attacks. Therefore, traffic may be routed through a particular device that provides the intrusion detection function.

Traditional routing algorithms rely on local information at each router regarding its neighboring links and devices to route data. A router maintains such information in a routing table. Based on the destination address of an incoming packet, a router uses its routing table to forward the packet to a specific neighboring device.

A technique, referred to as Software Defined Networks (SDNs), separates the control and forwarding functions into separate devices. A control device may use a global knowledge of the network topology to determine a path through the network of forwarding devices for individual data flows. In this way, the control device may, for example, establish paths that minimize delay or maximize bandwidth through the network, or route a data flow through a particular device that provides a particular network function.

Traditional approaches to providing network functions rely on setting up the function when initiating a network service. For example, a client may establish a virtual Ethernet connection that includes a firewall function at a medium level of security inspection. However, this approach may fail to adequately respond to changing network conditions and may waste resources by processing the network function for the duration of the network service.

SUMMARY

In view of the above, it would be advantageous to provide a mechanism for dynamically providing PPP-based-based network functions based on specified conditions.

Disclosed herein are system, method, and computer program product embodiments for dynamically applying PPP-based-based network functions to traffic flows based on heuristics, policy conditions, and client-specified conditions. A network monitors a network traffic flow to determine whether the network traffic flow meets a first criterion of a first rule. The criterion specifies that when the first criterion is met, a PPP-based-based network function be used to analyze or process the network traffic flow. When the network traffic flow is determined to meet the first criterion, the network determines a first route through the network to a PPP-based router that provides the PPP-based network function and configures one or more routers along the first route to forward the network traffic flow to the PPP-based router for analysis or processing.

Method and computer-readable medium embodiments are also disclosed.

Further embodiments and features, as well as the structure and operation of the various embodiments, are described in detail below with reference to accompanying drawings.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

In embodiments, network functions are dynamically applied to traffic flows based on heuristics, policy conditions and client-specified conditions. In an example, a network provides data communications between clients. The network establishes a service that provides communications between clients according to parameters associated with, for example, bandwidth, latency, jitter, etc. The network monitors its traffic, and when a specified condition is met, the network routes the service's traffic, or a portion of the service's traffic, through a processing element that applies a network function. The conditions may be related to any network characteristic, such as those associated with performance, capacity, security, etc. The conditions may be user-defined or set by the network administrators. The network function may also be applied according to a schedule. The network function may be removed after another condition is met or after a specified period of time. Providing network functions in response to conditions and schedules gives clients and administrators improved flexibility in managing the connections and performance and may help reduce overall network resource consumption.

A programmable packet processor (PPP) is a hardware processor that routes packets having a data plane that is programmable. A data plane (or data forwarding plane) defines the part of the router architecture that decides what to do with packets arriving on an inbound interface. Conventional fixed-function ASICs running on conventional routers are inflexible. On the other hand, FPGAs (field-programmable gate arrays), NPUs (network processor units), and generic all-purpose CPUs (central processing units) allow certain flexibility. However, routers using FPGAs, NPUs, or generic all-purpose CPUs can be unacceptably slow, typically between $1/10$ to $1/100$ the performance of routers using fixed-function ASICs. In contrast, PPPs are different from fixed-function ASICs, FPGAs, NPUs, and generic all-purpose CPUs. A PPP allows programming flexibility yet maintains performance comparable to fixed-function ASICs. For example, a PPP of a PPP-based router can be programmed to inspect, classify, modify and replicate packets, and integrate dynamic interaction with the application layer without degradation in performance. A programmable packet processor may reside in a hardware or software based switch, NIC, router, network appliance, etc. An example of a PPP is the TOFINO™ processor available from Barefoot Networks of Palo Alto, Calif.

A conventional non-PPP-based router often runs one or more fixed-function ASICs on its data forwarding plane. In contrast, a PPP-based router runs one or more PPPs on its data forwarding plane. A PPP-based router may perform the same functions as a regular non-PPP-based router. For example, a PPP-based router may forward data packets between computer networks. A PPP-based router may exchange routing information with its neighboring PPP-based routers or non-PPP-based routers to communicate their connectivity. PPP-based routers may interconnect with regular routers to perform the traffic directing functions on the Internet. In addition, because of PPPs' advantages in both speed and programming flexibility, a PPP-based router running PPPs may also provide PPP-based network functions.

PPP-based network functions are network functions that are implemented on a PPP. PPP-based network functions may be any network functions that can be provided by data centers described respective to FIG. 1, or other resident devices in a wide area network (WAN) or a metropolitan area network (MAN). Such network functions include intrusion detection, firewall, packet inspection, data compression, WAN acceleration, TCP proxies, and network management functions. PPP-based routers may also be programmed to provide the additional PPP-based network functions, including real-time in-band network telemetry, real-time path load-balancing, real-time service chaining, real-time firewall, and real-time Access Control List (ACL). Details of these PPP-based network functions will be described in detail below with respect to FIGS. 1-2.

In embodiments, a network monitors a network traffic flow to determine whether the network traffic flow meets a first criterion of a first rule. The criterion specifies that when the first criterion is met, a PPP-based network function be used to analyze or process the network traffic flow. When the network traffic flow is determined to meet the first criterion, the network determines a first route through the network to a PPP-based router that provides the PPP-based network function and configures one or more routers along the first route to forward the network traffic flow to the PPP-based router for analysis or processing.

Figure 1:
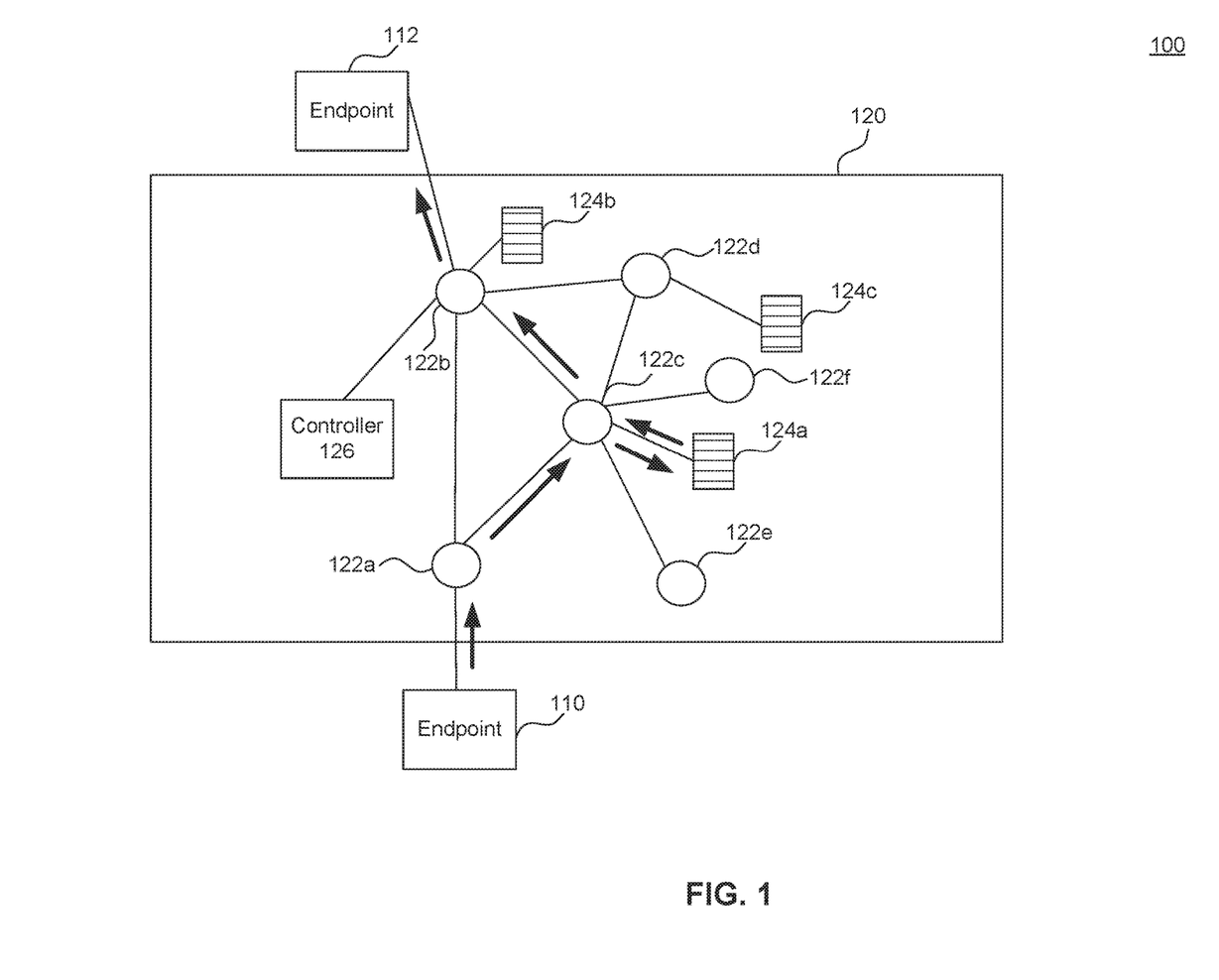
FIG. 1 shows a diagram illustrating a network environment for dynamically provisioning network functions provided by data centers, according to an example embodiment.

FIG. 1 shows a diagram illustrating a network environment 100 for dynamically provisioning network functions provided by data centers, according to an example embodiment.

Network environment 100 includes network 120 that provides network communications between multiple endpoints. In an embodiment, network 120 provides configurable data communications services to multiple endpoints for a service fee. In another embodiment, network 120 may provide additional capabilities that are provided as a part of the bundled network service at no additional charge.

Example endpoints 110 and 112 can be one or more client computing devices that utilize services of network 120. Endpoints 110 and 112 can be, by way of example, local area networks (LANs), computers, mobile devices, servers, clusters, etc. In an example, endpoints 110 and 112 may themselves be networks and may use network 120 as a transit network to communicate with each other.

Network 120 includes a plurality of routers 122a-f, one or more data centers 124a-c, and one or more controllers 126.

Network 120 can be a network configured to transmit data between client computing devices, such as, for example, personal computers, servers, mobile devices, local area networks (LANs), etc. In an embodiment, network 120 is a wide area network (WAN) or a metropolitan area network (MAN). In an embodiment, network 120 provides virtual networking services, such as, for example, virtual Ethernet connections, virtual local area networks (VLANs), virtual private networks (VPNs), etc. For example, network 120 can provide a virtual circuit with dedicated bandwidth for data communications between clients in remote locations. Network 120 may utilize any point-to-point, point-to-multipoint, or multipoint-to-multipoint networking protocols. Network access protocols used may include, for example, Ethernet, Asynchronous Transfer Mode (ATM), High-Level Data Link Control (HDLC), Frame Relay, Synchronous Optical Networking (SONET)/Synchronous Digital Hierarchy (SDH), Internet Protocol (IP), Transmission Control Protocol (TCP), User Datagram Protocol (UDP), Multiprotocol Label Switching (MPLS), etc.

Example routers 122a-f are configured to route data between endpoints. Routers 122a-f may be configured to provide connectivity services, such as, for example, virtual Ethernet connections, MPLS tunneling, VLAN routing, service level agreements (SLAs), etc. The term "router" as applied herein includes both network layer routers and data link layer switches. The connectivity service may provide a connection from at least two geographically disparate computers at a particular level of service, such as a particular level of bandwidth, latency, or jitter.

To provide the level of service, routers 122a-f may reserve bandwidth for the connection. Reserving may involve associating a particular bandwidth with a user. While still reserving bandwidth, a network may be oversubscribed, meaning that if all users were using all their associated bandwidth, the network would have insufficient capacity. A dedicated network connection can be seen as a private connection to one user. Such a dedicated network connection may be point-to-point, in which the connection connects two points on the network. The dedicated network connection may be public or private. On the other hand, the connection may also be multipoint-to-multipoint, in which a set of one or more points on the network is connected to a second set of one or more network points. A switching device may receive traffic for a particular network connection on a particular port.

FIG. 1 illustrates a network connectivity service connecting endpoint 110 and 112. The connectivity service may route data along a path including router 122a, which is connected to endpoint 110 and router 122b, which is connected to router 122a and endpoint 112. In this way, data addressed from endpoint 110 to endpoint 112 may first be sent to router 122a. Router 122a may forward the data to router 122b. And router 122b may forward the data to endpoint 112. In one embodiment, this path may be set up by controller 126, which has global knowledge of the topology of network 120. In another embodiment, this path may be established by each of routers 122a-f exchanging routing information with its neighbors to communicate their connectivity.

Example data centers 124a-c may provide network functions for application to network traffic or services. Data centers may be configured to provide network functions such as, for example, intrusion detection, firewall, packet inspection, data compression, WAN acceleration, TCP proxies, network management functions, etc. The network functions may be provided by the network service provider or by a third party.

In embodiments, data is dynamically re-routed to a data center for application of a network function, as illustrated in FIG. 1. In one embodiment, a user can specify that a network function be applied at some time period in the future. More particularly, the user can specify that the network function be applied to some or all of the data on the network connectivity service at a time period in the future. When the time period begins, network 120 is configured to route data on the network connectivity service to a data center that applies the network function. When the time period ends, network 120 is configured to route data on the network connectivity service to the destination without reaching a data center that applies the network function.

In another embodiment, the user can specify that a network function be applied when particular usage conditions are met. More particularly, the user can specify that the network function be applied to some or all of the data on the network connectivity service when the data meets certain conditions. The conditions may be based on aggregated data for the network connectivity service. For example, the condition may specify that data is routed to the data center for execution of the network function based on the bandwidth utilized, latency, packet loss, or network routes on the network connectivity services, or utilization level of the network function. In other examples, the condition may specify that a particular flow is routed to the data center for execution of the network function when the packets meet certain conditions (e.g., particular source/destination addresses or ports or payload data matching a particular pattern). When the condition is met, network 120 is configured to route data on the network connectivity service to a data center that applies the network function. When the condition is no longer met, network 120 is configured to route data on the network connectivity service to the destination without reaching a data center that applies the network function.

In the example illustrated in FIG. 1, an Ethernet connection network service may be configured between endpoints 110 and 112. The service may be enhanced by applying a firewall function to traffic moving from endpoint 110 to endpoint 112. To apply the firewall function, traffic from endpoint 112 directed to endpoint 112 may be routed from router 122a to router 122c. Router 122c can then transmit the traffic to data center 124a, which can inspect the traffic and apply the firewall function. The traffic can then be transmitted to router 122b and then endpoint 112.

Controller 126 may configure and manage routers 122a-f and data centers 124a-c to create, maintain, and remove network services and network functions. Controller 126 may be implemented in one or more devices connected to the network.

Controller 126 may configure routing tables at routers 122a-f to create network services. For example, to create a virtual Ethernet connection between endpoints 110 and 112, controller 126 may create a network path by adding entries to the routing tables of routers 122a and 122b. Controller 126 may also later add a network function, such as a firewall, to the virtual Ethernet connection between endpoints 110 and 112. To add the firewall, controller 126 may configure the routing tables of routers 122a, 122b and 122c to add an MPLS label to the service's traffic that forwards the traffic through data center 124a. Controller 126 may also communicate with data center 124a to verify the data center's resource availability to process the firewall, and to configure data center 124a to perform the firewall function.

Figure 2:
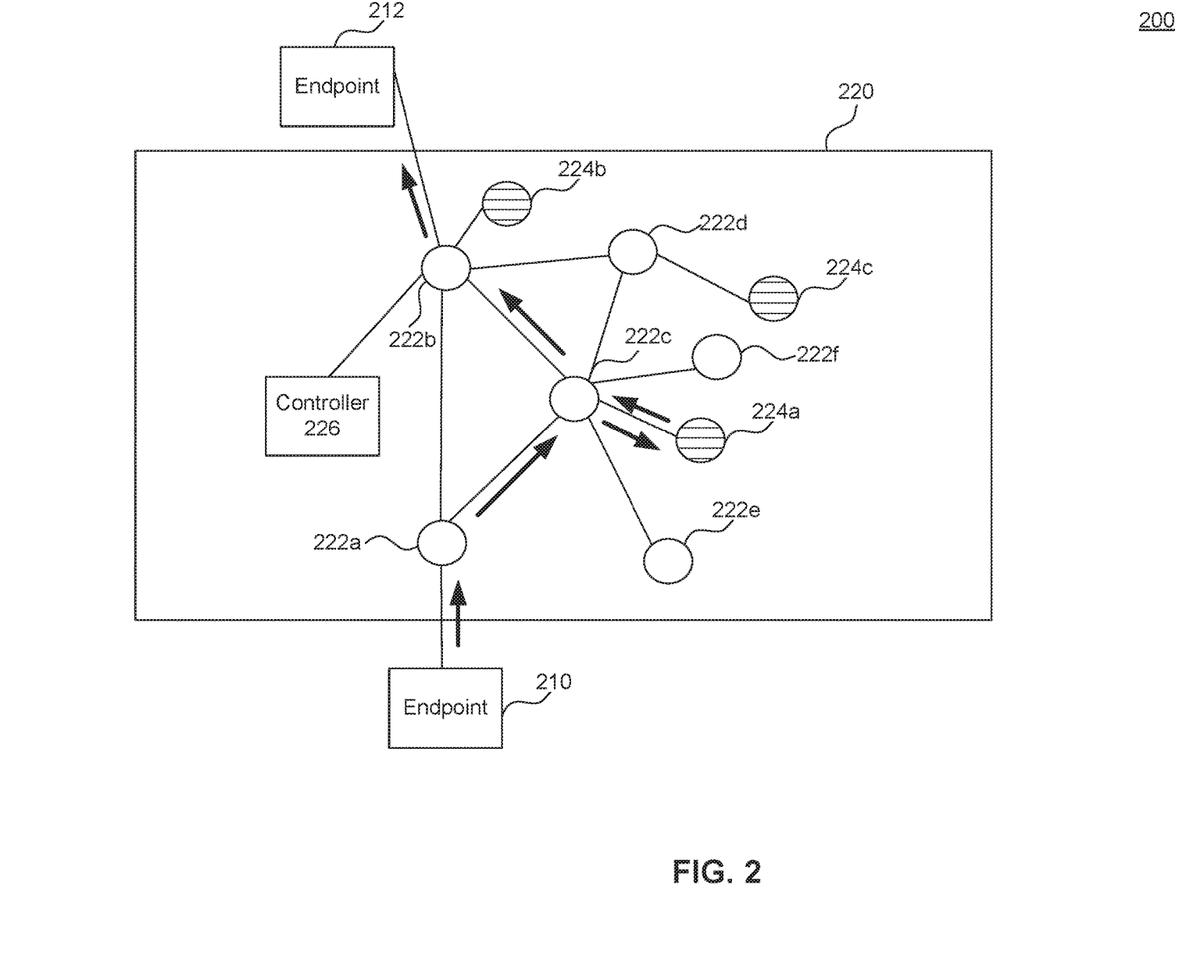
FIG. 2 shows a diagram illustrating a network environment for dynamically provisioning PPP-based network functions provided by routers using programmable packet processors (PPPs), according to an example embodiment.

FIG. 2 shows a diagram illustrating a network environment 200 for dynamically provisioning PPP-based network functions provided by PPP-based routers, according to an example embodiment.

Network environment 200 includes network 220 that provides network communications between multiple endpoints. In an embodiment, network 220 provides configurable data communications services to multiple endpoints for a service fee. In another embodiment, network 220 may provide additional capabilities that are provided as a part of the bundled network service at no additional charge.

Example endpoints 210 and 212 can be one or more client computing devices that utilize services of network 220. Endpoints 210 and 212 can be, by way of example, local area networks (LANs), computers, mobile devices, servers, clusters, etc. In an example, endpoints 210 and 212 may themselves be networks and may use network 220 as a transit network to communicate with each other.

Network 220 includes a plurality of routers 222a-f, one or more PPP-based routers 224a-c, and one or more controllers 226.

Network 220 can be a network configured to transmit data between client computing devices, such as, for example, personal computers, servers, mobile devices, local area networks (LANs), etc. In an embodiment, network 220 is a wide area network (WAN) or a metropolitan area network (MAN). In an embodiment, network 220 provides virtual networking services, such as, for example, virtual Ethernet connections, virtual local area networks (VLANs), virtual private networks (VPNs), etc. For example, network 220 can provide a virtual circuit with dedicated bandwidth for data communications between clients in remote locations. Network 220 may utilize any point-to-point, point-to-multipoint, or multipoint-to-multipoint networking protocols. Network access protocols used may include, for example, Ethernet, Asynchronous Transfer Mode (ATM), High-Level Data Link Control (HDLC), Frame Relay, Synchronous Optical Networking (SONET)/Synchronous Digital Hierarchy (SDH), Internet Protocol (IP), Transmission Control Protocol (TCP), User Datagram Protocol (UDP), Multiprotocol Label Switching (MPLS), etc.

Routers 222a-f and PPP-based routers 224a-c are configured to route data between endpoints. Routers 222a-f and PPP-based routers 224a-c may be configured to provide connectivity services, such as, for example, virtual Ethernet connections, MPLS tunneling, VLAN routing, service level agreements (SLAs), etc. The term "router" as applied herein (e.g., routers 222a-f and PPP-based routers 224a-c) includes both network layer routers and data link layer switches. The connectivity service may provide a connection from at least two geographically disparate computers at a particular level of service, such as a particular level of bandwidth, latency, or jitter.

Network 220 may comprise routers, such as routers 222a-f and PPP-based routers 224a-c. PPP-based routers 224a-c may provide the same routing functions as routers 222a-f. A PPP-based router may run one or more programmable packet processors (PPPs) on the router's data plane (i.e., data forwarding plane). Routers 222a-f may run one or more non-PPP-based processors, such as fixed-function ASICs (application-specific integrated circuits), FPGAs (field-programmable gate arrays), NPUs (network processor units), and generic all-purpose CPUs (central processing units). A programmable packet processor (PPP) may be a programmable data plane processor that performs at equal to or better speed than an ASIC. Conventional fixed-function ASICs are inflexible. On the other hand, FPGAs, NPUs, and generic all-purpose CPUs allow certain flexibility. However, routers using FPGAs, NPUs, or generic all-purpose CPUs can be unacceptably slow, typically between $\frac{1}{10}$ to $\frac{1}{100}$ the performance of routers using fixed-function ASICs. In contrast, PPPs are different from fixed-function ASICs, FPGAs, NPUs, and generic all-purpose CPUs. A PPP allows programming flexibility yet maintains performance comparable to fixed-function ASICs. For example, a PPP of a PPP-based router can be programmed to inspect, classify, modify and replicate packets, and integrate dynamic interaction with the application layer without degradation in performance. A programmable packet processor may reside in a hardware or software based switch, NIC, router, network appliance, etc.

In one embodiment, a user may program a PPP using the P4 (Programming Protocol-Independent Packet Processors) programming language. P4 is an open source, high-level programming language designed to allow programming of packet forwarding planes of network devices. P4 is a declarative language for telling forwarding-plane devices (switches, NICs, firewalls, filters, etc.) how to process packets. P4 works in conjunction with SDN (software-defined networking) control protocols like OpenFlow. In contrast to a general purpose programming language such as C or Python, P4 is a domain-specific language with a number of constructs optimized around network data forwarding. Users can use P4 to program the network for themselves without degradation in performance.

PPP-based routers 224a-c may provide PPP-based network functions. PPP-based network functions can be any network functions that can be provided by data centers 124a-c, as described above respective to FIG. 1. PPP-based routers 224a-c may also be programmed—using P4, for example—to provide the following PPP-based network functions.

Real-Time in-Band Network Telemetry:

Monitoring and troubleshooting large networks with complex end-to-end topologies spanning physical switches and network virtualization layers poses several challenges. One example scenario is that a particular application may experience high latency occasionally. The transient nature of the problem can make it very difficult to identify the network element (e.g., a router) and the interfering flows that cause the occasional high latency. A framework such as "In-band Network Telemetry" (INT) enables collection of end-to-end real-time state directly in the data path. A source endpoint may embed instructions in packets listing the types of network state to be collected from the network elements (e.g., routers). Each network element inserts the requested network state in the packet as it traverses the network. P4 provides a natural way to express the kind of packet header parsing and modifications required for INT.

Real-Time Path Load-Balancing Scheme:

When a network operator wants to reduce congestion, the network operator may pick and choose among various ONOS (open network operating system) applications, each one bringing in a different P4 program that implements a specific path load-balancing scheme. In this case, logically-centralized control can aid in the process of swapping the forwarding configuration on routers, in a way that avoids or minimizes network disruption. Layer-4 server load balancing is fundamental to provide high availability and auto-scaling to services running in clouds. In cloud data centers, large number of servers are dedicated to run software load balancers (SLBs) that distribute client requests to the pool of other servers backing the load-balanced virtual address. While SLBs are easy to deploy, this software based approach suffers from high latency, low per-server processing capacity, and high cost. In contrast, LBSwitch (Load Balancing Switch) may embed the L4 load balancing functionality directly on PPP-based routers. LBSwitch guarantees per-connection consistency—forwarding all the packets of a connection to the identical server—for millions of concurrent connections by using low-cost merchant-grade switches' on-chip memory. For example, PPP-based routers may be programmed in P4 and integrated with OpenStack LBaaS (Load Balancer as a Service) APIs.

Real-Time Routing to a Network Function (Service Chaining—within the Same CHIP/CPU, or Elsewhere):

The network traffic processing required by a specific use case is often expressed by forming a chain of Virtual Network Functions (VNFs). VNFs in the chain may be hosted on the server CPU or on the SmartNIC. VNFs may also be decomposed into components called Micro-VNFs, with the components again being hosted on the server CPU and/or the SmartNIC. A P4 program (compiled to native code running on the SmartNIC) defines the overall semantics of the data path within a SmartNIC equipped server and expresses how VNFs and Micro-VNFs should be composed within this platform. Mechanisms like tunnels and service headers (e.g., programmed using P4) may be employed to establish the VNF service chain across multiple network nodes.

Real-Time Firewall/ACL:

While software based firewall/ACLs are easy to deploy, this software based approach suffers from high latency, low per-server processing capacity, and high cost. PPP-based firewall/ACLs guarantee per-connection consistency for millions of concurrent connections by using low-cost merchant-grade switches' on-chip memory. PPP-based routers may be programmed in P4 to provide firewall/ACL network functions.

To provide the level of service, routers 222a-f and PPP-based routers 224a-c may reserve bandwidth for the connection. Reserving may involve associating a particular bandwidth with a user. While still reserving bandwidth, a network may be oversubscribed, meaning that if all users were using all their associated bandwidth, the network would have insufficient capacity. A dedicated network connection can be seen as a private connection to one user. Such a dedicated network connection may be point-to-point, in which the connection connects two points on the network. The dedicated network connection may be public or private. On the other hand, the connection may also be multipoint-to-multipoint, in which a set of one or more points on the network is connected to a second set of one or more network points. A switching device may receive traffic for a particular network connection on a particular port.

FIG. 2 illustrates a network connectivity service connecting endpoint 210 and 212. The connectivity service may route data along a path including router 222a, which is connected to endpoint 210 and router 222b, which is connected to router 222a and endpoint 212. In this way, data addressed from endpoint 210 to endpoint 212 may first be sent to router 222a. Router 222a may forward the data to router 222b. And router 222b may forward the data to endpoint 212. In one embodiment, this path may be set up by controller 226, which has global knowledge of the topology of network 220. In another embodiment, this path may be established by each of routers 222a-f and PPP-based routers 224a-c exchanging routing information with its neighbors to communicate their connectivity.

Example PPP-based routers 224a-c may provide PPP-based network functions for application to network traffic or services. PPP-based routers 224a-c may be configured to provide network functions such as, for example, intrusion detection, firewall, packet inspection, data compression, WAN acceleration, TCP proxies, network management functions, etc. The PPP-based network functions may be provided by the network service provider or by a third party.

In embodiments, data is dynamically re-routed to a PPP-based router for application of a PPP-based network function, as illustrated in FIG. 2. In one embodiment, a user can specify that a PPP-based network function be applied at some time period in the future. More particularly, the user can specify that the PPP-based network function be applied to some or all of the data on the network connectivity service at a time period in the future. When the time period begins, network 220 is configured to route data on the network connectivity service to a PPP-based router that applies the PPP-based network function. When the time period ends, network 220 is configured to route data on the network connectivity service to the destination without reaching a PPP-based router that applies the PPP-based network function.

In another embodiment, the user can specify that a PPP-based network function be applied when particular usage conditions are met. More particularly, the user can specify that the PPP-based network function be applied to some or all of the data on the network connectivity service when the data meets certain conditions. The conditions may be based on aggregated data for the network connectivity service. For example, the condition may specify that data is routed to the PPP-based router for execution of the PPP-based network function based on the bandwidth utilized, latency, packet loss, or network routes on the network connectivity services, or utilization level of the PPP-based network function. In other examples, the condition may specify that a particular flow is routed to the PPP-based router for execution of the PPP-based network function when the packets meet certain conditions (e.g., particular source/destination addresses or ports or payload data matching a particular pattern). When the condition is met, network 220 is configured to route data on the network connectivity service to a PPP-based router that applies the PPP-based network function. When the condition is no longer met, network 220 is configured to route data on the network connectivity service to the destination without reaching a PPP-based router that applies the network function.

In the example illustrated in FIG. 2, an Ethernet connection network service may be configured between endpoints 210 and 212. The service may be enhanced by applying a firewall function to traffic moving from endpoint 210 to endpoint 212. To apply the firewall function, traffic from endpoint 210 directed to endpoint 212 may be routed from router 222a to router 222c. Router 222c can then transmit the traffic to PPP-based router 224a, which can inspect the traffic and apply the firewall function. The traffic can then be transmitted to router 222b and then endpoint 212.

In other embodiments, network 220 may first determine whether an existing route already comprises at least one PPP-based router that can provide the PPP-based network function. If so, the network may keep the existing route, rather than re-routing. The network may trigger the PPP-based network function by enabling a PPP program corresponding to the PPP-based network function, on the PPP-based router on the existing route. When the time expires or the condition is no longer met, network 220 may disable the PPP program corresponding to the PPP-based network function on the PPP-based router.

Controller 226 may configure and manage routers 222a-f and PPP-based routers 224a-c to create, maintain, and remove network services and network functions. Controller 226 may be implemented in one or more devices connected to the network.

Controller 226 may configure routing tables at routers 222a-f and PPP-based routers 224a-c to create network services. For example, to create a virtual Ethernet connection between endpoints 210 and 212, controller 226 may create a network path by adding entries to the routing tables of routers 222a and 222b. Controller 226 may also later add a network function, such as a firewall, to the virtual Ethernet connection between endpoints 210 and 212. To add the firewall, controller 226 may configure the routing tables of routers 222a, 222b and 222c to add an MPLS label to the service's traffic that forwards the traffic through PPP-based router 224a. Controller 226 may also communicate with PPP-based router 224a to verify the PPP-based router's resource availability to process the firewall, and to configure PPP-based router 224a to perform the firewall function.

Figure 3:
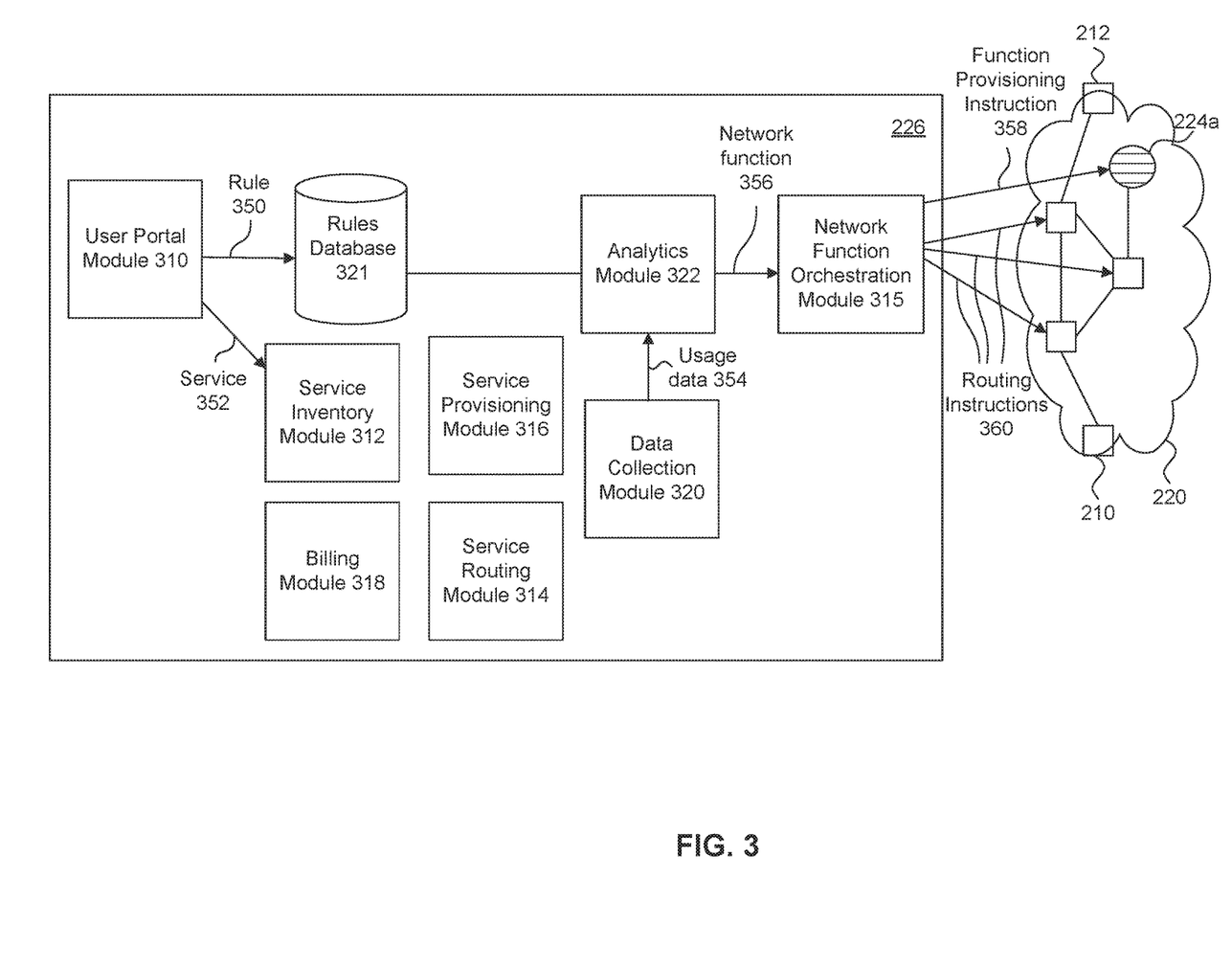
FIG. 3 shows a diagram illustrating functional modules of a controller for dynamically provisioning PPP-based network functions, according to an example embodiment.

FIG. 3 is a block diagram illustrating functional modules of a controller 226, according to an example embodiment. For simplicity of description, the modules are described as forming part of a single controller entity, however, the various components may form part of one or more separate devices in any combination. Moreover, while certain modules are described as performing various functions, the module boundaries have been arbitrarily defined for simplicity of description.

Controller 226 includes portal module 310, service inventory module 312, service routing module 314, service provisioning module 316, billing module 318, data collection module 320, rules database 321, and analytics module 322. Controller 226 may be inside or outside network 220.

Portal module 310 may be a user portal module that provides an user interface for a client of network 320 to configure network services and functions. A user may interact with portal module 310 to request a new network service or modify existing network services. For example, a user may establish a new virtual Ethernet connection between endpoints 210 and 212 with a 10 Mb/s bandwidth. Portal module 310 may communicate to the client the availability and cost information for the requested services. In some embodiments, portal module 310 may be an app/api module that interacts with a third-party application to configure network services and functions, using APIs (application programming interfaces) provided by portal module 310.

Using portal module 310, a user may also establish conditions and rules for initiating network functions. For example, a user may specify that all TCP traffic be analyzed by an intrusion detection system if certain conditions are true. Conditions may involve multiple factors and analytics related to any network, connection or service characteristics. For example, a user may specify that whenever TCP traffic on the virtual Ethernet connection increases by two standard deviations from its average TCP traffic, the network activate a firewall and initiate a TCP packet dump for the next 30 minutes. In another embodiment, the conditions may specify a time period in the future to apply the network function. The time period may also repeat at regular intervals (e.g., weekly, monthly, etc.). Once created, portal module 310 creates a rule—illustrated in FIG. 3 as rule 350—and rules database 321.

Service inventory module 312 maintains an inventory of the services that network 220 is provisioning. The inventory may contain entries for each service, including the type of service, parties of the service, the service's parameters, SLAs, etc. For example, an entry may specify a virtual Ethernet connection between endpoints 210 and 212. The entry may further specify that the connection must provide a 10 Mb/s bandwidth and a maximum latency of 10 ms, and that all traffic must be inspected by an intrusion detection function. In some embodiments, the inventory may contain entries for PPP-based network functions provided by each PPP-based router.

Service routing module 314 determines network routes for services in service inventory module 312. Service routing module 314 analyzes the services and their associated requirements, SLAs or conditions. Service routing module 314 may perform an analysis based on knowledge of the network's topology and the totality of services to be provisioned and their requirements to determine an appropriate route for each service. For example, for a service that requires a higher bandwidth, service routing module 314 may select one high bandwidth route, and for a service that requires a lower latency, service routing module 314 may select a shorter route. In this manner, service routing module 314 implements SLAs associated with each service.

Service provisioning module 316 configures each network device (e.g., routers, switches, etc.) to implement routes determined by service routing module 314 and network function orchestration module 315. Service provisioning module 316 may configure each router's routing tables, MPLS tunneling configurations, etc., to cause the forwarding of services according to the determined routes. The implemented routes may include adding headers to packets in the service to trigger the application of a network function. Users may create services in service inventory module 312 through portal module 310, as explained above and illustrated in FIG. 3 as service 352. Network administrators may also create services through administrator interfaces, or by setting rules, conditions, and analytics that initiate network services and functions, as explained below with reference to the data collection and analytics modules. In another embodiment, a third-party application may automatically use APIs, provided by portal module 310, to create services in service inventory module 312.

Rules database 321 maintains rules associated with criteria, conditions, or configurations that are evaluated to initiate or terminate network functions. The rules may be provided by or derived from user-provided configurations associated with network services. Network administrators may also provide rules based on desired network management or performance goals. Network function orchestration module 315 may evaluate rules in rules database 321 to trigger one or more network functions to be applied when certain conditions occur, and determine time periods or conditions to terminate their application.

Data collection module 320 monitors network links, elements, and services to gather usage data 354, including network performance statistics and other information related to the traffic flow including packets routed through the network. In an embodiment, data collection module 320 aggregates statistics collected by each network element. Data collection module 320 may also configure periodic or event-driven reporting at network elements. For example, when a router receives data of a particular type specified in a rule, the router may inform data collection module 320.

Analytics module 322 performs analysis of usage data 354 collected by data collection module 320. Analytics may be used to comply with SLAs by guaranteeing that network resources are available for present and future demand. Analytics module 322 may compare usage data 354 with conditions from rules database 321. When one of the conditions is satisfied, analytics module 322 determines what network function is specified for that rule in rules database 321. Then, analytics module 322 may signal the network function—illustrated as network function 356 in FIG. 3—to network function orchestration module 315.

Network function orchestration module 315 determines and manages the provisioning of network functions to be applied to network services. Network function orchestration module 315 may store information about network topology, link capacity, router capacity, PPP-based router capacity, etc., to provision resources and routes for network functions. Network function orchestration module 315 may receive information or commands indicating that a PPP-based network function is to be applied to a network service. Based on this information, network function orchestration module 315 determines which PPP-based router to use for the PPP-based network function. If an existing route includes a PPP-based router, network function orchestration module 315 may determine to use the PPP-based router on the existing route. If not, network function orchestration module 315 may determine to use another PPP-based router outside the existing route.

In one example, analytics module 322 may send a signal to network function orchestration module 315 indicating that a link's utilization is nearing capacity, and based on this network function orchestration module 315 may determine that a compression function should be applied to a service that is traveling through the link. In another example, a user or network administrator triggers the initiation of a PPP-based network function, and service inventory module 312 sends a signal to network function orchestration module 315 to provision the PPP-based network function.

To provision a PPP-based network function, network function orchestration module 315 may determine an available PPP-based router 224, inside or outside network 220, that can process the function. Once an available PPP-based router 224 is found, network function orchestration module 315 may reserve resources at the PPP-based router and enable a PPP program corresponding to the PPP-based network function on the PPP-based router. Network function orchestration module 315 may then determine how to appropriately route the service to the PPP-based router, if the PPP-based router is outside the existing route. Network function orchestration module 315 may, for example, instantiate a process or a thread at PPP-based router 224, or a reserve pooled resource. Network function orchestration module 315 may then determine a route that meets the SLAs for the process and for other processes that may share the route's links.

To provision the function data, network function orchestration module 315 may send function provisioning instruction 358 to PPP-based router 224 to provide the function. Function provisioning instruction 358 may specify the network service that the PPP-based function is to be applied to, the times the function should be started and ended, and any parameters of the function. To provision the new route, network function orchestration module 315 may send routing instructions 360 to respective routers on the route from the source to PPP-based router 224, and, possibly, from PPP-based router 224 to the destination. Routing instructions 360 may specify routing tables entries, MPLS routing entries, etc.

Billing module 318 communicates with service inventory module 312 and network function orchestration module 315 to determine how much to bill a client for network services and network functions. In an embodiment, a user may be billed for the amount of time that a network function is applied to a network service.

For example, assume network 220 is providing a virtual Ethernet service between endpoints 210 and 212, and routing the service through routers 222a and 222b. In the example, analytics module 322 may initially detect that the latency between endpoints 210 and 212 is 5 ms, and that the SLA for the service requires a maximum latency of 10 ms. At a later time, analytics module 322 may detect that the latency has increased to 7 ms. Analytics module 322 may, independently or in response to the latency increase, inspect the route between endpoints 210 and 212 and discover that the utilization for the link between routers 222a and 222b is at 80%. Analytics module 322 may determine, based on rules or specified conditions in rules database module 321, that 80% exceeds a threshold utilization for this link, and can send a signal to network function orchestration module 315 to take remedial action. Network function orchestration module 315 may determine that a compression function can be applied to the virtual Ethernet service traffic flowing from endpoint 210 to endpoint 212 to decrease link utilization. Network function orchestration module 315 may use network topology and PPP-based router location information to determine a route and appropriate PPP-based router(s) that can apply the function. For example, network function orchestration module 315 may provision a compression function at PPP-based router 224a (by enabling a corresponding PPP program) and a decompression function at PPP-based router 224b by enabling another corresponding PPP program or initiating a network function at each of these PPP-based routers. Network function orchestration module 315 can then communicate to service provisioning module 316 the new route for the service traffic that comprises: receiving the service packets from endpoint 210 at router 222a, forwarding them to router 222c, then to PPP-based router 224a for compression, sending the compressed service packets back to router 222c, then to router 222b, then to PPP-based router 224b for decompression, back to router 222b and finally to endpoint 212. Service provisioning module 316 would configure each of routers 222a, 222b, and 222c to implement the route.

Figure 4:
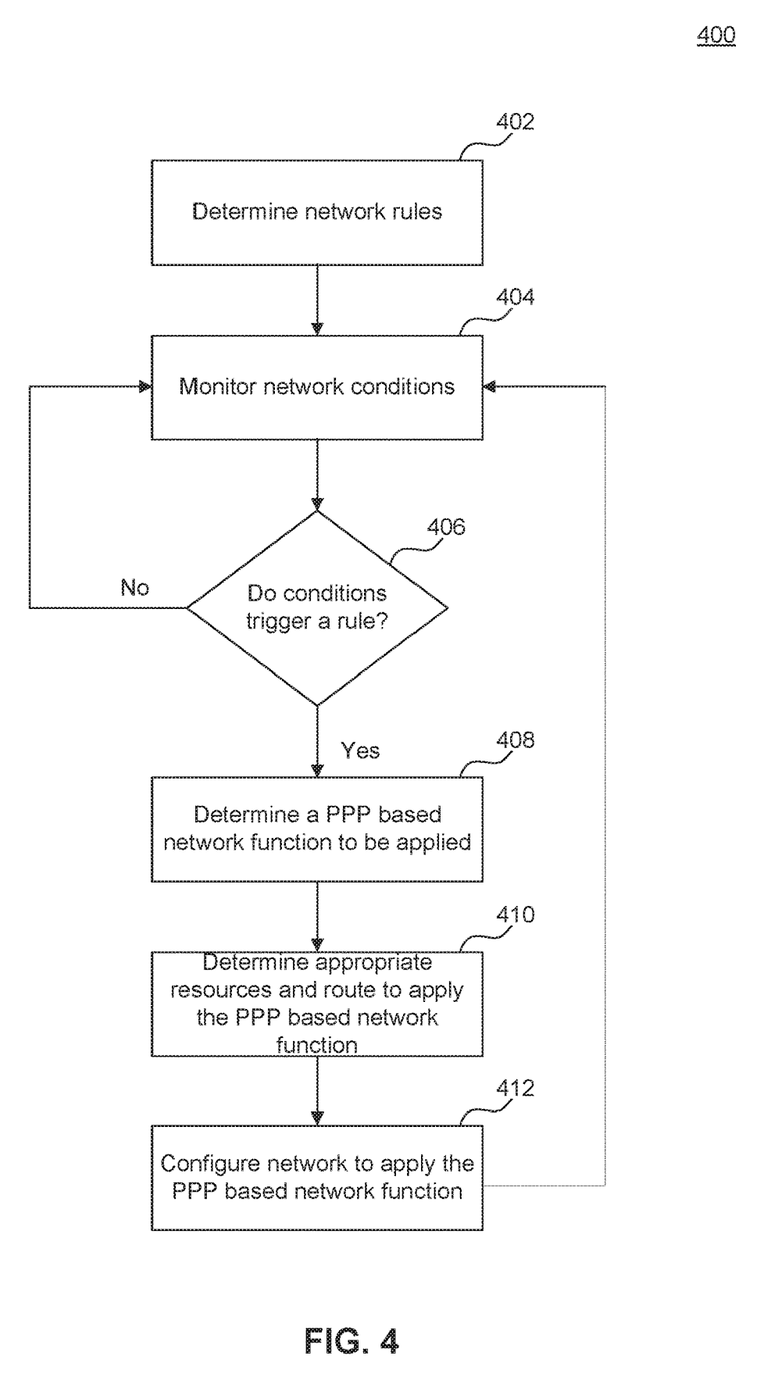
FIG. 4 is a flowchart illustrating a method of dynamically provisioning PPP-based network functions, according to example embodiment.

FIG. 4 is a flowchart that depicts a method 400 of dynamically provisioning PPP-based network functions, according to example embodiment.

At step 402, the network receives or determines rules and other configuration information for monitoring network conditions and applying PPP-based network functions. Network users or administrators may input the rules and configuration information. For example, the network may provide network users with a portal interface to subscribe, manage and configure network services and PPP-based functions. Users may configure rules, conditions, or schedules for applying PPP-based network functions to network services. For example, a network user may use a portal module to subscribe to a virtual Ethernet service that provides connectivity between two endpoint LANs, and enter any SLA requirements for the service. The user may then configure options in the portal related to the virtual Ethernet service, for example, configuring a rule specifying that if traffic through the virtual Ethernet connection increases by more than two standard deviations from the average, the network should set up a firewall through the connection and initiate a packet dump for the duration of the traffic spike. The user may set up these rules at the time the virtual Ethernet service is set up, or after the Ethernet service is running. The user may also change this configuration, and add different rules or functions to the service at a later time. In another embodiment, a third-party application may automatically use APIs, provided by portal module 310, to input the rules and configuration information described above.

Rules and configuration information may also be associated with network links, network elements, or other network characteristics in general. For example, a configuration may specify actions to be taken if a network link becomes over-utilized by traffic from multiple services.

At step 404, the network monitors conditions associated with the rules and configurations. For example, if a rule associated with a service specifies that a packet dump should be performed when traffic exceeds two standard deviations from an average, the network may keep track of the service's average traffic and its standard deviation.

At step 406, the network determines whether any monitored network conditions trigger a rule or event associated with the network or a service. If a network condition meets a criterion established by any configuration or rule, the network proceeds to step 408 to determine a PPP-based network function to be applied.

At step 408, the network determines a PPP-based network function to apply. The PPP-based network function may be specified by a rule or configuration, or be selected based on available network resources. For example, if the network has detected a traffic anomaly, the network may choose to perform a packet dump and initiate a medium security firewall. The network may then analyze traffic and select a different PPP-based network function to apply, such as a higher security intrusion detection function.

At step 410, once the network has selected a PPP-based network function, the network determines appropriate resources and routes for providing the PPP-based network function. For example, the network may determine a PPP-based router with sufficient available resources to process the function and within a route that satisfies any SLA requirement of the service or services to which the function is to be applied. The network may use topology and routing information available at a central location, and may query PPP-based routers to determine resource availability.

At step 412, the network configures network elements, for example, routers, switches, PPP-based routers, etc., to provide the network function. The network may configure, for example, MPLS tunnels to route service traffic through a PPP-based router. Routers may be configured to add an MPLS label to packets of the service, and PPP-based router(s) may be configured to apply the functions to packets containing the appropriate MPLS label. After the configuration, network flow may be routed through the PPP-based router.

In some embodiments, the network may first determine whether an existing route already comprises at least one PPP-based router that can provide the PPP-based network function. If so, the network may keep the existing route, rather than re-routing. The network may trigger the PPP-based network function by enabling a PPP program corresponding to the PPP-based network function, on the PPP-based router on the existing route.

In an embodiment, the network may change or remove the application of a PPP-based network function by continuing to monitor network conditions and evaluating appropriate rules. For example, if a rule specified that a service's traffic should be firewalled during a traffic spike, the network may monitor the traffic to determine when the spike has ended, and then remove the firewall function at that time. For example, the network may disable a PPP program corresponding to the firewall function at that time. In an embodiment, a user may specify an amount of time the function is to be applied as part of a rule. In this manner, the network reacts and adapts to events and provides PPP-based functions dynamically when appropriate, thus saving resources while providing enhanced functionalities.

Figure 5:
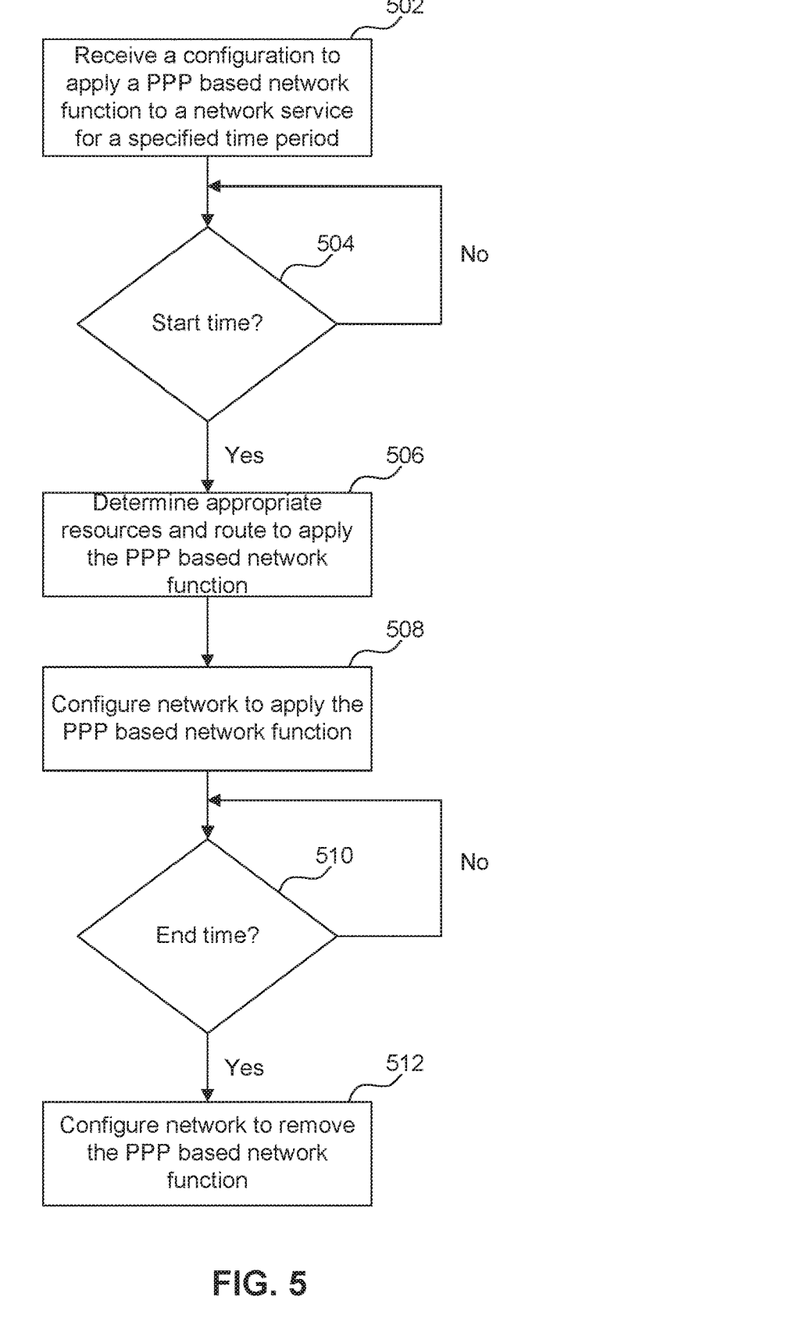
FIG. 5 is a flowchart illustrating a method of dynamically provisioning PPP-based network functions for a specified time period, according to example embodiment.

FIG. 5 is a flowchart that depicts a method 500 of dynamically provisioning PPP-based network functions for a specified time period, according to an example embodiment.

At step 502, the network receives rules and other configuration information for monitoring network conditions and applying network services or functions for a specified time period. Network users or administrators may input the rules and configuration information that schedule the application of network functions or indicate an amount of time the functions should be applied. For example, a network user may use a portal module to subscribe to a virtual Ethernet service that provides connectivity between two endpoint LANs, and enter any SLA requirements for the service. The user may observe that TCP traffic through the virtual Ethernet service increases dramatically every day from 2 PM to 4 PM. The user may then configure a rule specifying that the network should perform a packet dump and activate an intrusion detection function every day from 2 PM to 4 PM. In another embodiment, a third-party application may automatically use APIs, provided by portal module 310, to input the rules and configuration information described above.

As shown at steps 504 and 506, at or before the start time for the scheduled function the network determines the start time and appropriate resources and routes for providing the PPP-based network function. For example, the network may determine a PPP-based router with sufficient available resources to process the function and within a route that satisfies any SLA requirement of the service or services to which the PPP-based function is to be applied. The network may use topology and routing information available at a central location, and may query PPP-based router(s) to determine resource availability.

At step 508, the network configures network elements, for example, routers, switches, PPP-based routers, etc., to provide the PPP-based network function. The network may configure, for example, MPLS tunnels to route service traffic through a PPP-based router. Routers may be configured to add an MPLS label to packets of the service, and PPP-based routers may be configured to apply the PPP-based functions to packets containing the appropriate MPLS label. After the configuration, network flow may be routed through the PPP-based router.

In some embodiments, the network may first determine whether an existing route already comprises at least one PPP-based router that can provide the PPP-based network function. If so, the network may keep the existing route, rather than re-routing. The network may trigger the PPP-based network function by enabling a PPP program corresponding to the PPP-based network function, on the PPP-based router on the existing route.

Once the specified time period expires, the network removes the PPP-based network function by, again, configuring network elements—such as routers 222a-f and PPP-based routers 224a-c—as shown in steps 510 and 512.

Figure 6:
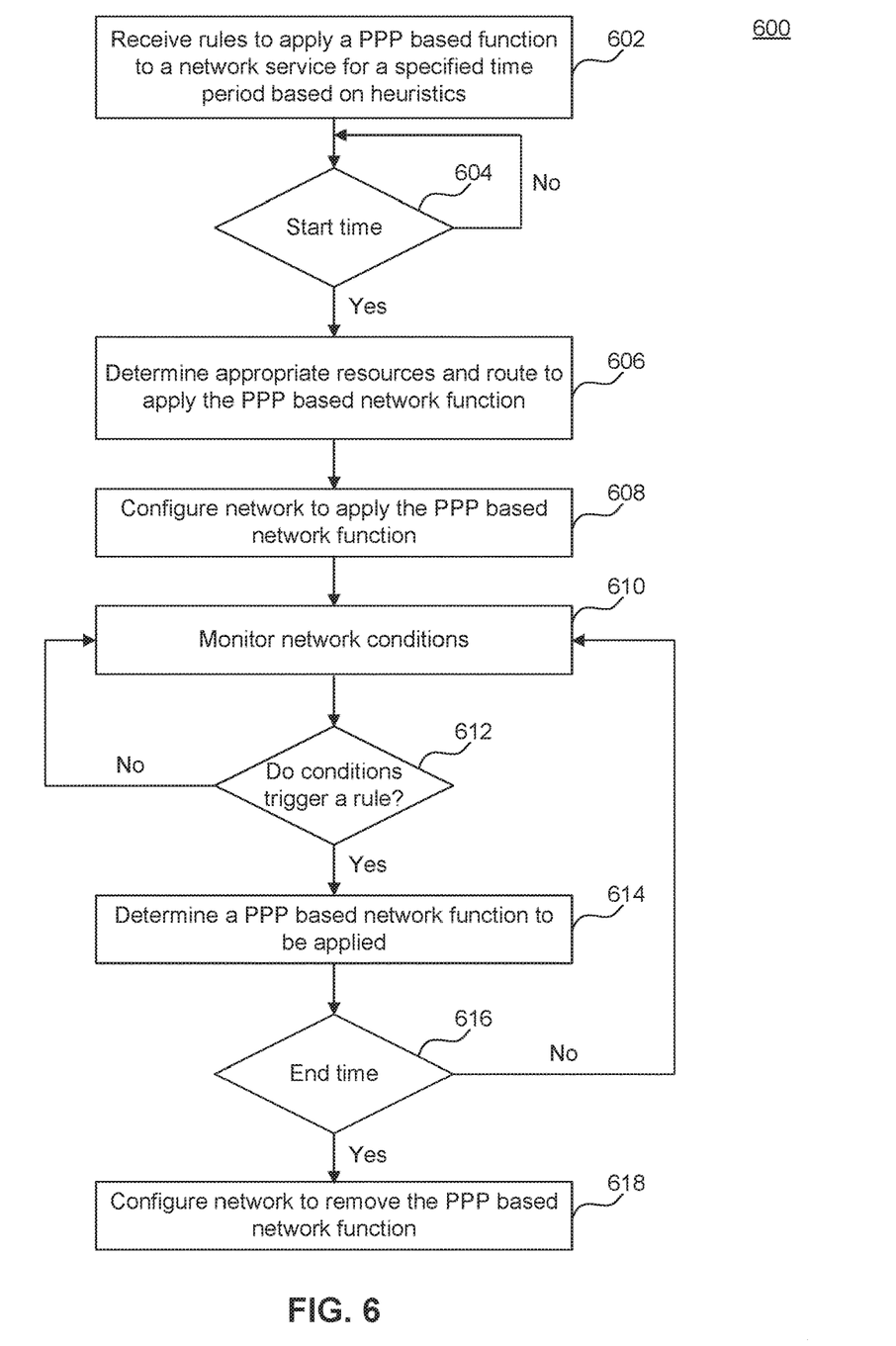
FIG. 6 is a flowchart illustrating a method of dynamically provisioning PPP-based network functions for a specified time period based on embedding of heuristics, according to example embodiment.

FIG. 6 is a flowchart that depicts a method 600 of dynamically provisioning PPP-based network functions for a specified time period based on embedding of heuristics, according to an example embodiment.

At step 602, the network receives rules and other configuration information for monitoring network conditions and applying network services or functions for a specified time period based on embedding of heuristics. The embedding may be within the first condition of time period, for example. The received rules and other configuration information provide information for monitoring network conditions and applying PPP-based network functions for a specified time period. Network users or administrators may input the rules and configuration information that schedule the application of network functions or indicate an amount of time the PPP-based functions should be applied.

As shown at steps 604 and 606, at or before the start time for the scheduled function the network determines the start time and appropriate resources and routes for providing the PPP-based network function. For example, the network may determine a PPP-based router with sufficient available resources to process the function and within a route that satisfies any SLA requirement of the service or services to which the PPP-based function is to be applied. The network may use topology and routing information available at a central location, and may query PPP-based router(s) to determine resource availability.

At step 608, the network configures network elements, for example, routers, switches, PPP-based routers, etc., to provide the PPP-based network function. The network may configure, for example, MPLS tunnels to route service traffic through a PPP-based router. Routers may be configured to add an MPLS label to packets of the service. After the configuration, network flow may be routed through the PPP-based router.

In some embodiments, the network may first determine whether an existing route already comprises at least one PPP-based router that can provide the PPP-based network function. If so, the network may keep the existing route, rather than re-routing. The network may trigger the PPP-based network function by enabling a PPP program corresponding to the PPP-based network function, on the PPP-based router on the existing route.

At step 610, the network monitors conditions associated with the rules and configurations. For example, if a rule associated with a service specifies that a packet dump should be performed when traffic exceeds two standard deviations from an average, the network may keep track of the service's average traffic and its standard deviation.

At step 612, the network determines whether any monitored network conditions trigger a rule or event associated with the network or a service. If a network condition meets a criterion established by any configuration or rule, the network proceeds to step 614 to determine a PPP-based network function to be applied.

At step 614, the network determines a PPP-based network function to apply. The PPP-based network function may be specified by a rule or configuration, or be selected based on available network resources. For example, if the network has detected a traffic anomaly, the network may choose to perform a packet dump and initiate a medium security firewall. The network may then analyze traffic and select a different PPP-based network function to apply, such as a higher security intrusion detection function. The network may apply the PPP-based network functions by enabling corresponding PPP programs to process or analyze the network traffic.

Once the specified time period expires, the network removes PPP-based network function by, again, configuring network elements—such as routers 222a-f and PPP-based routers 224a-c. For example, the network may remove a PPP-based network function on a PPP-based router by disabling a corresponding PPP program on the PPP-based router.

Method 600 describes dynamically provisioning PPP-based network functions for a specified time period based on embedding of heuristics. Method 600 applies to a network including PPP-based routers (such as network 220). For a network (such as network 120) without PPP-based routers, method 600 also applies by configuring routes so that data centers 124a-c would apply network functions as described with respect to environment 100.

Figure 7:
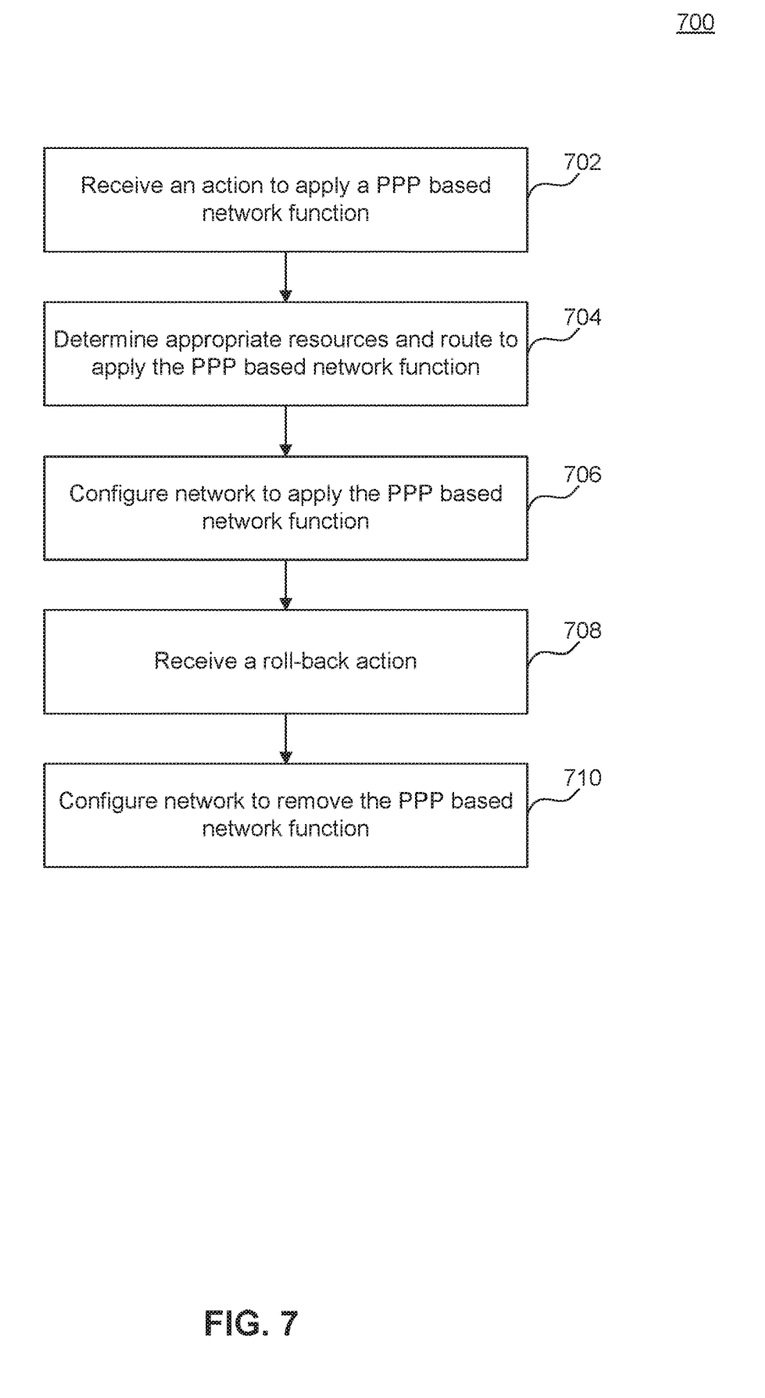
FIG. 7 is a flowchart illustrating a method of dynamically provisioning PPP-based network functions based on actions, according to example embodiment.

FIG. 7 is a flowchart that depicts a method 700 of dynamically provisioning PPP-based network functions based on actions, according to an example embodiment.

At step 702, the network receives an action for applying a PPP-based network function. Network users or administrators may input the action. Actions may be associated with network services, network links, network elements, or other network characteristics in general.

At step 704, the network determines appropriate resources and routes for providing the PPP-based network function. For example, the network may determine a PPP-based router with sufficient available resources to process the function and within a route that satisfies any SLA requirement of the service or services to which the PPP-based function is to be applied. The network may use topology and routing information available at a central location, and may query PPP-based router(s) to determine resource availability.

At step 706, the network configures network elements, for example, routers, switches, PPP-based routers, etc., to provide the PPP-based network function. The network may configure, for example, MPLS tunnels to route service traffic through a PPP-based router. Routers may be configured to add an MPLS label to packets of the service, and PPP-based routers may be configured to apply the PPP-based functions to packets containing the appropriate MPLS label. Afterwards, network traffic is routed to the configured PPP-based router(s). The network may apply the PPP-based network function by enabling a corresponding PPP program to process or analyze the network traffic. After the configuration, network flow may be routed through the PPP-based router. In one embodiment, a user uses a portal module to enter network configuration information. In another embodiment, a third-party application may automatically use APIs, provided by portal module 310, to input the network configuration information described above.

In some embodiments, the network may first determine whether an existing route already comprises at least one PPP-based router that can provide the PPP-based network function. If so, the network may keep the existing route, rather than re-routing. The network may trigger the PPP-based network function by enabling a PPP program corresponding to the PPP-based network function, on the PPP-based router on the existing route.

At step 708, the network receives an action for rolling back the PPP-based network function. Network users or administrators may input the rollback action.

At step 710, the network removes PPP-based network function by, again, configuring network elements—such as routers 222a-f and PPP-based routers 224a-c. For example, the network may remove a PPP-based network function on a PPP-based router by disabling a corresponding PPP program on the PPP-based router.

As the above embodiments show, PPP-based adaptive network function chaining provides the following advantages over a conventional SDN:

the network may program a PPP to provide on-demand packet flow handling and heuristics/data-capture;

the network may apply embedded/overlay conditions (e.g., network heuristics inside a time-triggered condition);

the network may provide the route-traffic-to logic by routing traffic flows to PPP, or the traffic flows may remain over the same/pre-existing PPP (i.e., the traffic flows could stay in place with a new PPP logic applied);

the network may apply PPP configurations to a PPP, ahead of routing network traffic to the PPP;

the network may receive rules upfront (e.g., from APIs, UIs, or mobile apps), as defined/driven by the customer or likewise by the network service provider;

the network may specify user/machine interworking on "top" (e.g., APIs, Apps, or UIs). PPP-based network functions may be triggered or programmed by analytics/heuristics, or calendar, or on-demand;

the network may utilize a service inventory module (statically assigned, or dynamically discovered or "active")—such as service inventory module 312 to determine which PPP(s) to route to (or, if the network flow is already on a route with a PPP-based router); and PPPs may exist in switches, NICs, routers, appliances, etc.

CONCLUSION

Rules database module 321 may be any stored type of structured memory, including a persistent memory. In examples, a database may be implemented as a relational database or file system.

Each of the blocks and modules in FIGS. 1-3 may be implemented in hardware, software, firmware, or any combination thereof.

Each of the blocks and modules in FIGS. 1-3 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described examples, but should be defined only in accordance with the following claims and their equivalents.

What is claimed is:

1. A computer-implemented method for dynamically provisioning a programmable packet processor (PPP)-based network function in a network comprising one or more PPP-based routers, the computer-implemented method comprising:
    (a) monitoring a network traffic flow, including at least one packet routed through the network, to determine whether the network traffic flow meets a first criterion of a first rule, the first rule specifying that, when the first criterion is met, the PPP-based network function be used to analyze or process the network traffic flow; and
    (b) when the network traffic flow is determined to meet the first criterion:
        (i) selecting, from the one or more PPP-based routers of the network, a PPP-based router able to provide the PPP-based network function;
        (ii) configuring the selected PPP-based router to enable the PPP-based network function;
        (iii) determining a first route through the network to the selected PPP-based router;
        (iv) determining one or more routers along the first route; and
        (v) configuring the one or more routers along the first route to forward the network traffic flow to the selected PPP-based router for analysis or processing.

2. The computer-implemented method of claim 1, wherein the selected PPP-based router runs one or more programmable packet processors (PPPs) on a data forwarding plane of the selected PPP-based router.

3. The computer-implemented method of claim 2, wherein the one or more PPPs of the selected PPP-based router are programmed to provide the PPP-based network function.

4. The computer-implemented method of claim 3, wherein the one or more PPPs of the selected PPP-based router are programmed to provide the PPP-based network function using a programming protocol-independent packet processors (P4) programming language.

5. The computer-implemented method of claim 1, wherein the traffic flow is routed through an existing route before the traffic flow is determined to meet the first criterion, and the selecting the PPP-based router (b)(i) comprises:
    (1) determining that the existing route includes a PPP-based router able to provide the PPP-based network function;
    (2) selecting the PPP-based router included in the existing route; and
    (3) keeping the existing route as the determined first route.

6. The computer-implemented method of claim 1, wherein the PPP-based network function comprises at least one of real-time in-band network telemetry, real-time path load-balancing, real-time service chaining, real-time firewall, and real-time Access Control List (ACL).

7. The computer-implemented method of claim 1, wherein the configuring (b)(ii) comprises enabling a PPP program corresponding to the PPP-based network function.

8. A program storage device tangibly embodying a program of instructions executable by at least one machine to dynamically provision a programmable packet processor (PPP)-based network function in a network comprising one or more PPP-based routers, the instructions comprising the steps of:
    (a) monitoring a network traffic flow, including at least one packet routed through the network, to determine whether the network traffic flow meets a first criterion of a first rule, the first rule specifying that, when the first criterion is met, the PPP-based network function be used to analyze or process the network traffic flow; and
    (b) when the network traffic flow is determined to meet the first criterion:
        (i) selecting, from the one or more PPP-based routers of the network, a PPP-based router able to provide the PPP-based network function;
        (ii) configuring the selected PPP-based router to enable the PPP-based network function;
        (iii) determining a first route through the network to the selected PPP-based router;
        (iv) determining one or more routers along the first route; and
        (v) configuring the one or more routers along the first route to forward the network traffic flow to the selected PPP-based router for analysis or processing.

9. The program storage device of claim 8, wherein the selected PPP-based router runs one or more programmable packet processors (PPPs) on a data forwarding plane of the selected PPP-based router.

10. The program storage device of claim 9, wherein the one or more PPPs are programmed to provide the PPP-based network function.

11. The program storage device of claim 10, wherein the one or more PPPs are programmed to provide the PPP-based network function using a programming protocol-independent packet processors (P4) programming language.

12. The program storage device of claim 8, wherein the traffic flow is routed through an existing route before the traffic flow is determined to meet the first criterion, and the selecting the PPP-based router (b)(i) comprises:
 (1) determining that the existing route includes a PPP-based router able to provide the PPP-based network function;
 (2) selecting the PPP-based router included in the existing route; and
 (3) keeping the existing route as the determined first route.

13. The program storage device of claim 8, wherein the PPP-based network function comprises at least one of real-time in-band network telemetry, real-time path load-balancing, real-time service chaining, real-time firewall, and real-time Access Control List (ACL).

14. The program storage device of claim 8, wherein the configuring (b)(ii) comprises enabling a PPP program corresponding to the PPP-based network function.

15. A system for dynamically provisioning a programmable packet processor (PPP)-based network function in a network comprising one or more PPP-based routers, comprising:
 a memory; and
 one or more processors coupled to the memory, the one or more processors configured to:
 monitor a network traffic flow, including at least one packet routed through the network, to determine whether the network traffic flow meets a first criterion of a first rule, the first rule specifying that, when the first criterion is met, the PPP-based network function be used to analyze or process the network traffic flow; and
 when the network traffic flow is determined to meet the first criterion:
 select, from the one or more PPP-based routers of the network, a PPP-based router able to provide the PPP-based network function;
 configure the selected PPP-based router to enable the PPP-based network function;
 determine a first route through the network to the selected PPP-based router;
 determine one or more routers along the first route; and
 configure the one or more routers along the first route to forward the network traffic flow to the selected PPP-based router for analysis or processing.

16. The system of claim 15, wherein the selected PPP-based router runs one or more programmable packet processors (PPPs) on a data forwarding plane of the selected PPP-based router.

17. The system of claim 16, wherein the one or more PPPs are programmed to provide the PPP-based network function.

18. A computer-implemented method for dynamically provisioning a programmable packet processor (PPP)-based network function in a network comprising one or more routers able to include a PPP, the computer-implemented method comprising:
 (a) monitoring a network traffic flow, including at least one packet routed through the network, to determine whether the network traffic flow meets a first criterion of a first rule, the first rule specifying that, when the first criterion is met, the PPP-based network function be used to analyze or process the network traffic flow; and
 (b) when the network traffic flow is determined to meet the first criterion:
 (i) selecting, from the one or more routers of the network, a router able to provide the PPP-based network function;
 (ii) configuring the selected router to enable the PPP-based network function;
 (iii) determining a first route through the network to the selected router;
 (iv) determining one or more routers along the first route; and
 (v) configuring the one or more routers along the first route to forward the network traffic flow to the selected PPP-based router for analysis or processing.

* * * * *